(12) United States Patent
Yoshida et al.

(10) Patent No.: US 6,660,364 B2
(45) Date of Patent: Dec. 9, 2003

(54) MAGNETIC RECORDING MEDIUM

(75) Inventors: Kenichiro Yoshida, Toyonaka (JP); Kimihiko Kaneno, Nagaokakyo (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 10/231,126

(22) Filed: Aug. 30, 2002

(65) Prior Publication Data

US 2003/0113584 A1 Jun. 19, 2003

Related U.S. Application Data

(63) Continuation-in-part of application No. 09/735,623, filed on Dec. 14, 2000.

(30) Foreign Application Priority Data

Dec. 16, 1999 (JP) ............................................. 11-357160

(51) Int. Cl.[7] .................................................. G11B 5/71
(52) U.S. Cl. ................. 428/141; 428/336; 428/694 BS; 428/694 BP; 428/694 BR
(58) Field of Search .................................. 428/141, 336, 428/694 BS, 694 BP, 694 BR, 900

(56) References Cited

U.S. PATENT DOCUMENTS 5,126,215 A * 6/1992 Aonuma et al. ...... 428/694 BG
5,489,466 A    2/1996 Inaba et al.

FOREIGN PATENT DOCUMENTS

| JP | 01-229421 | 9/1989 |
| JP | 04-321920 | * 11/1992 |
| JP | 05-234066 | 9/1993 |
| JP | 63-259830 | 10/1998 |
| JP | 10-340442 | 12/1998 |

* cited by examiner

*Primary Examiner*—Stevan A. Resan
(74) *Attorney, Agent, or Firm*—Birch, Stewart, Kolasch & Birch, LLP

(57) ABSTRACT

The object of the present invention is to provide a magnetic recording medium, particularly, a tape for data backup, which is less in wear of head, small in output deterioration and high in recording density. According to the present invention, there is provided a magnetic recording medium comprising a non-magnetic support having on one side at least one non-magnetic undercoat layer and a magnetic layer in succession and on another side a back coat layer, in which the magnetic layer is an ultra-thin magnetic layer having a thickness of not more than 0.20 μm provided by adjusting a standard deviation of histogram obtained by measuring the surface roughness of the magnetic layer by a light interference surface roughness meter to not more than 0.56 nm.

2 Claims, No Drawings

MAGNETIC RECORDING MEDIUM

This application is a continuation-in-part of application Ser. No. 09/735,623 filed on Dec. 14, 2000, the entire contents of which are hereby incorporated by reference.

BACKGROUND OF THE INVENTION

The present invention relates to a magnetic recording medium excellent in recording density characteristics and less in wear of head and output deterioration.

Magnetic tapes have various uses such as audiotapes, videotapes and computer tapes. Especially, in the field of tapes for data backup, with increase of capacity of hard disks, the data of which are objects for backup, those of several ten GB in storage capacity per one roll have been put to the market, and for accommodation to further increase of capacity of hard disks, it is essential to enhance the recording density of backup tapes.

In order to accommodate the enhancement of recording density, it has become necessary to produce magnetic tapes by using ferromagnetic powders improved in magnetic characteristics, further improving the dispersibility of ferromagnetic powders or carrying out a processing for reducing the spacing loss between medium and head.

For the improvement in magnetic characteristics of ferromagnetic powders, since the greater residual magnetization of magnetic layer is preferred for increase of output, ferromagnetic iron alloy powders are mainly used as magnetic powders in place of conventional oxide magnetic powders or Co-containing iron oxide magnetic powders, and ferromagnetic iron alloy powders having a coercive force of not less than 135 kA/m (1700 Oe) have been proposed (e.g., JP-A-5-234064, JP-A-6-25702, and JP-A-6-139553).

Furthermore, for improving the dispersibility of ferromagnetic powders, there have been proposed a method of using binders having polar functional groups such as sulfonic acid group, phosphoric acid group and alkali metal salts thereof, a method of using dispersing agents together with the binders, a method of continuously carrying out kneading and dispersing steps of magnetic coating compositions, and a method of adding lubricants after dispersion (e.g., JP-A-62-23226, JP-A-2-101624, JP-A-3-216812, JP-A-3-17827, JP-A-4-47586 and JP-A-8-235566).

For reducing the spacing loss between tape-head, there have been proposed a method of carrying out a smoothening treatment of magnetic layer under the conditions of high temperatures and high pressures at calendering step, and a method of providing a non-magnetic undercoat layer below the magnetic layer to inhibit the effect of the surface property of non-magnetic support on the surface of the magnetic layer in addition to the above-mentioned method of increasing dispersibility of magnetic powders (e.g., JP-B-1-1297, JP-B-7-60504 and JP-A-4-19815).

Furthermore, in addition to the enhancement of performance of magnetic layer as mentioned above, it is recently proposed for making a structure of a magnetic recording medium suitable for short wavelength recording to provide an undercoat layer between a magnetic layer and a non-magnetic support and further to use a thin layer of not more than 1 $\mu$m as the magnetic layer (JP-A-62-154225). In these magnetic recording media, the undercoat layer is provided as a lubricant retaining layer to reduce self-demagnetization loss and reproduction loss caused by using a thin magnetic layer and, besides, to improve deterioration of running properties and endurance caused by allowing the media to run many times. In the case of magnetic recording media having a single thin magnetic layer, the magnetic layer is not compressed at the calendering step, and, hence, improvement in filling properties and smoothness of the magnetic layer cannot be attained. Therefore, from these viewpoints, the undercoat layer must be provided when the magnetic layer is an ultra-thin layer of not more than 1 $\mu$m.

On the other hand, with advancement of digital information recording system, reduction of information recording area has been attempted. The reduction of recording area has been attempted by shortening the recording wavelength and narrowing the recording track width. There are devices of digital data storage system of about 0.5 $\mu$m in the shortest recording wavelength and about 10 $\mu$m in track width. Considering recording and reproduction of information, thickness loss increases and reproduction output does not increase when the ratio of thickness of the magnetic layer to the recording wavelength exceeds a certain value. This thickness loss is caused by self-demagnetization which generates a magnetic field erasing the recording signal inside the magnetic layer, and even when the thickness of the magnetic layer is increased over ½ of the shortest recording wavelength $\lambda$, the output usually does not increase. Therefore, when saturation recording is carried out, thickness of the magnetic layer effective for magnetic recording is considered to be ⅓ of the shortest recording wavelength, and in the recording system as mentioned above, thickness of the magnetic layer must be very thin, namely, not more than 0.20 $\mu$m.

In the recording system of large capacity, due to the necessity to increase transfer speed, the relative speed of medium and head tends to be increased. Therefore, the temperature of glass part of magnetic head is apt to rise as compared with conventional recording systems owing to generation of heat caused by sliding of medium-head. For this reason, the phenomenon is often observed that wearing powders of glass or coating film produced by the sliding adhere to the glass part of the head to generate opaque scum, resulting in decrease of reproduction output or scraping powders of the magnetic coating film adhere to the sliding face of the medium above the head to generate incrustation scum, resulting in decrease of output due to increase of the space between medium-head. The stain called head stain can be wiped off with alcohol, but opaque scum or incrustation scum cannot be wiped off with alcohol and can be removed only by abrasion. Therefore, it is supposed that the head stain is caused by exfoliation of the magnetic coating film while the opaque scum or incrustation scum is caused by sticking of matters exfoliating from head materials and magnetic coating film which are burnt with the heat generated by sliding of head-medium.

The present invention has been accomplished to solve the above problems, and the object is to inhibit deterioration of output caused by opaque scum or incrustation scum in magnetic recording media having a magnetic layer of not more than 0.20 $\mu$m in thickness.

SUMMARY OF THE INVENTION

As a result of an intensive research conducted by the inventors, they have provided a magnetic recording medium comprising a non-magnetic support on one side of which at least one non-magnetic undercoat layer and a magnetic layer containing ferromagnetic metal powders are formed in succession and on another side of which is formed a back coat layer, said magnetic layer having a thickness of not more than 0.20 $\mu$m and having a standard deviation of not more than $1.0 \times 10^{-5}$ m in the distribution of height of inequalities on the surface of the magnetic coating film which is obtained by subjecting the surface of the magnetic layer to measurement by a light interference surface roughness meter. This magnetic recording medium has substantially no opaque scum and incrustation scum.

DETAILED DESCRIPTION OF THE INVENTION

In order to inhibit the head stain, the inventors have paid attention to surface properties of the magnetic layer which contacts the magnetic head under sliding. The surface of the magnetic layer is macroscopically highly smooth, but microscopically has unevenness caused by protrusions and dents, and the inventors have noticed that the magnetic recording medium and the magnetic head contact with each other at the protrusions and they have accomplished the present invention. That is, they have found that in order to diminish the head stain in magnetic recording media having a thin magnetic layer, opaque scum or incrustation scum can be diminished by lowering the height of the microscopic protrusions on the surface of the media or reducing the number of the protrusion to inhibit heat generation. Thus, the present invention has been accomplished.

As aforementioned, opaque scum or incrustation scum is generated as a result of fine fragments of the coating film and wearing powders of the head materials being burnt and sticking to the head. This burning and sticking is caused by the heat generated due to the sliding of the head and the medium. When the medium has the surface form of the present invention, inequalities of the surface of the coating film become small and the number of the contact points of the protrusions with the head per unit area increases, and thus the contact area at one contact point increases. As a result, contact pressure reduces to lower the sliding resistance and reduce the heat generation, resulting in decrease of burning of fragments of the coating film and wearing powders of the head materials and sticking of them to the head.

The present invention relates to a magnetic recording medium having no high protrusions and deep dents in the surface of the magnetic layer. In order to realize such medium, the inventors have conducted intensive investigation on the composition of magnetic powders, length of major axis, coercive force, particle size and amount of carbon black added, particle size and amount of abrasives added, dispersing conditions of coating composition, calendering conditions of coating film, surface abrading conditions, etc. As a result, it has been surprisingly found that even if recording media have nearly the same arithmetical mean deviation of profile (Ra), those having a small standard deviation in distribution of height of inequalities in the surface of the coating film can attain the object. The height of inequalities and the protrusions cannot be grasped by the conventional analytical methods which seize the shape of the whole surface, and can be grasped by understanding the texture of the coating film. As a method for understanding the texture of the coating film, according to the present invention, a method has been developed which comprises measuring a standard deviation in distribution of height on the components having a period of inequality of not more than 10 μm obtained when the surface properties of the magnetic layer are measured by a light interference surface roughness meter. The present invention is a magnetic recording medium in which when the surface properties of the magnetic layer are measured by a light interference surface roughness meter, the components having a period of inequality of not more than 10 μm have a standard deviation of not more than 0.56 nm in distribution of height. It has been found that when a thickness of the magnetic layer of not more than 0.20 μm is attained by using the above surface properties, generation of incrustation scum or opaque scum on the magnetic head at the time of sliding can be diminished. The decrease of output can be reduced by the inhibition of head stain. It has been confirmed that the above effect is especially conspicuous in the case of thickness of the magnetic layer being not more than 0.20 μm.

Here, distribution of height obtained by measurement of the surface properties by a light interference surface roughness meter, histogram as an expression of the distribution of height and standard deviation thereof in the present invention can be obtained by the following procedures. The surface of the magnetic layer is subjected to measurement by a non-contact surface roughness measuring apparatus (TOPO3D manufactured by WYKO Co., Ltd.) in which an objective lens (×40) is set, at a measuring wavelength of 648.9 nm and a measuring area of 250 μm×250 μm with correction of inclination, crook and cylinder. The resulting data are subjected to digital filter processing under the conditions of no correction of inclination and cylinder. The digital filter processing is carried out under the conditions of a high-pass filter of 10 μm and a low-pass filter of 100 μm. The information of height obtained as a result of calculation is segmented into 200 groups and frequency in each group is obtained. In this way, a histogram of 200 groups is obtained. Then, the data is pigeonholed using the median in each group as a representative value. The smallest value in the representative values is referred to as "0", and the representative value in each group is recalculated in terms of the above value "0". The standard deviation is obtained from the following formula based on the recalculated representative value and the frequency.

$$\text{Standard deviation} = \{[(N \times \Sigma Xi^2) - (\Sigma Xi)^2]/N^2\}^{1/2}$$

In the above formula, Xi means the representative value of each group, Ni means the frequency in each group, and N means the total of the frequencies in the respective groups (total of frequencies=56386). For analysis of the results of the measurement, a software "Vision" manufactured by WYKO Co., Ltd. is used. For analysis of the histogram, a software "Excel" manufactured by Microsoft Co., Ltd. is used.

In the present invention, in order to diminish generation of opaque scum or incrustation scum on the magnetic head, the standard deviation must be not more than 0.56 nm, and this is preferably not more than 0.45 nm, more preferably not more than 0.28 nm. If the standard deviation is greater than 0.56 nm, there are produced many high protrusions and deep dents on the surface of the magnetic layer, which mean wide standard deviation, and, thus, unevenness becomes conspicuous to cause considerable opaque scum or incrustation scum and, besides, increase of surface noise.

In some case, a lubricant may affect the running properties or endurance even when the surface properties are adjusted as above. Although use of a lubricant is preferred, fatty acid in the lubricant greatly affects generation of the incrustation scum. It is supposed that this is because the fatty acid acts as a plasticizer for the coating film to affect the delicate fragmentation of the surface of the magnetic layer at the time of sliding of the head. Therefore, as to the amount of the lubricant for the magnetic recording medium of the present invention, it is preferably such that when the medium comprising the non-magnetic support, the non-magnetic under coat layer and the magnetic layer is stored in hexane for 16 hours at room temperature, amount of the fatty acid extracted in hexane is not more than 2 mg/m$^2$.

Furthermore, it is preferred that when the medium is stored successively in hexane, THF and a solution of acetic acid in hexane (acetic acid=0.5 wt %) in this order at room temperature for 16 hours, the total amount of the fatty acid extracted in hexane, THF and the acetic acid solution is not more than 25 mg/m$^2$ (the amount calculated per 1 $\mu$m in thickness of the coating film). It is supposed that the component extracted with hexane is one which is present in the voids in the coating film or on the surface of the coating film, the component extracted with THF is one which is dissolved in the binder, and the component extracted with the acetic acid solution is one which is adsorbed to magnetic powders.

The component extracted with THF is supposed to be one dissolved into the binder, and causes plasticization of the binder. Moreover, the component extracted with the acetic acid solution is supposed to be one adsorbed to the magnetic powders and brings about reduction of the amount of the binder adsorbed to the magnetic powders or decrease of adsorptivity. The plasticization of the binder, the reduction of the amount of the binder adsorbed to the magnetic powders or the decrease of adsorptivity causes deterioration of sliding endurance to bring about increase of fragmentation of the coating film, and thus the incrustation scum increases. Therefore, the extraction amount of them is preferably smaller. The amount of extract with THF and the amount of extract with acetic acid solution are affected by the composition of the binder, kind of the dispersing agent and amount of the dispersing agent. However, if the total amount of the extract with hexane, the extract with THF and the extract with the acetic acid solution is larger than 25 mg/m$^2$ calculated in terms of 1 $\mu$m in thickness of the coating film (magnetic layer+undercoat layer), generation of the incrustation scum increases. Therefore, the amount of the lubricant extracted is preferably such that the total amount of the extracts with hexane, with THF and with the acetic acid solution is not more than 25 mg/m$^2$ calculated in terms of 1 $\mu$m in thickness of the coating film. It is more preferably not more than 22 mg/m$^2$, further preferably not more than 10 mg/m$^2$.

Furthermore, when influence of the extraction amount of fatty acid on generation of incrustation scum depending on the kind of the extraction solvents was examined, the influence of the extraction amount with the acetic acid solution was the greatest. The extraction amount with the acetic acid solution is preferably not more than 75% of the total extraction amount. If it is more than 75%, generation of the scum increases, and more preferred range is not more than 50%.

As the fatty acids, lauric acid, myristic acid, stearic acid, palmitic acid, behenic acid, oleic acid, linolic acid and the like can be suitably selected and used. For the addition of these fatty acids, conventionally known methods can be employed. For example, the fatty acid is added to the coating composition, or after forming the magnetic layer and the undercoat layer, the lubricant solution is coated thereon and dried or spray dried thereon or the layers are dipped in the lubricant solution.

However, when the fatty acid is added to the magnetic coating composition, it is preferred to subject the coating composition to a dispersion treatment by a sand mill or the like after the addition of the fatty acid to uniformly distribute the fatty acid in the magnetic coating film. In the conventional magnetic coating film of not less than 0.5 $\mu$m in thickness, the dispersion treatment after the addition of the fatty acid did not affect the generation of the incrustation scum. However, it has been found that in the case of a medium of not more than 0.20 $\mu$m in the thickness of magnetic layer, the generation of incrustation scum is greatly affected by the dispersion treatment of the fatty acid. It is well known that fatty acids are low in compatibility with binders, and fatty acids form domains in the binders. Here, it is considered that unless the dispersion treatment is carried out after the addition of fatty acid, the ratio of domain size to the thickness of the magnetic layer becomes great and diffusion of contacting force with a head cannot be sufficiently performed, resulting in increase of fragmentation.

In the present invention, the magnetic recording medium has a construction comprising a non-magnetic support, at least one undercoat layer provided on the support and a magnetic layer provided on the undercoat layer. As magnetic powders used in the magnetic layer, there are known ferromagnetic powders, for example, magnetic iron oxide powders such as $Fe_2O_3$, Co-modified magnetic iron oxide powders, ferromagnetic iron alloy powders mainly composed of Fe, barium ferrite, and strontium ferrite. Of these magnetic powders, ferromagnetic iron alloy powders are especially preferred because they have a high coercive force and can give a great output. However, since the coating film formed using the ferromagnetic iron alloy powders is lower in cohesive force to cause more fragmentation of the magnetic layer as compared with the coating film formed using magnetic iron oxide powders, it is especially effective to produce the surface properties of the magnetic layer according to the present invention. Furthermore, among the ferromagnetic iron alloy powders, those which contain Co can be expected to attain a high saturation magnetization and when the magnetic layer is an ultra-thin magnetic layer of not more than 0.2 $\mu$m, residual magnetic flux density can be improved and, hence, the Co-containing ferromagnetic iron alloy powders are especially preferred.

Such Co-containing ferromagnetic iron alloy powders can be prepared by (1) a method which comprises calcining goethite powders to make magnetite powders, subjecting the magnetite powders to ion-exchanging of divalent iron ion with Co ion in a Co ion-containing aqueous solution and reducing the powders with heating, (2) a method which comprises heating and reducing Co-containing acicular goethite powders obtained from an alkaline aqueous suspension of an iron salt and a Co salt, (3) a method of reducing a co-precipitate obtained from an iron salt and a Co salt added to an aqueous oxalic acid solution, (4) a method of heating and reducing iron oxide powders having Co adhered to the surface thereof, (5) a method of adding a reducing agent to a solution containing an iron salt and a Co salt, (6) a method of obtaining alloy magnetic powders by evaporating metals in an inert gas and allowing them to collide with gas molecules, (7) a method of reducing chlorides of iron and Co into metals with passing vapors thereof in a mixed gas of hydrogen and nitrogen or argon, etc. Among them, it is more preferred to use in combination the methods (1) and (2) capable of forming a solid solution of high Co content and providing a product excellent in corrosion resistance performance.

In the Co-containing ferromagnetic iron alloy powders, the Co content is preferably 5–40% in the weight ratio of Co/Fe. Within this range, a high saturation magnetization and a high coercive force can be attained, Co can be easily alloyed with magnetic iron metal, and excess of Co becomes an oxide and deterioration of magnetic characteristics can be prevented. A range of 5–30% is especially preferred.

Of the Co-containing ferromagnetic iron alloy powders, those which contain a rare earth element are preferred since particulate noise caused by magnetic particles can be diminished and, besides, output deterioration can be inhibited. This is because when Co-containing ferromagnetic iron alloy powders are used, output can be improved, but even when said magnetic powders are used to increase the output, C/N ratio decreases in the case of noise being also high, since the C/N ratio is relative to output and noise, and thus deterioration of output is great. In this case, the particulate noise caused by magnetic powders is one of the factors of the noise generated from the medium. Since this particulate noise is considered to result from ununiformity in particle size, if the magnetic powders have ununiformity in size, even in the unrecording state, there occurs variation in magnetic flux emitted from magnetic particles present in a certain area which contribute to head output, and this causes difference in output depending on the data recorded portions, resulting in increase of noise. Since the noise based on change in output is also added in the state of a signal being recorded, the noise further increases to reduce the relative C/N ratio. Especially, in the case of the shortest recording wavelength ($\lambda$) being not more than 0.5 $\mu$m, which is recently used for the tapes of computers, both the track density and the line recording density must be increased and, hence, influence of magnetic flux between the adjacent data becomes greater.

Therefore, in the present invention, as mentioned above, ferromagnetic iron alloy powders having the above particle diameter and containing a rare earth element together with Co are used as the magnetic powders. In this way, distribution of the particle size of the magnetic powders becomes uniform, particulate noise based on the particle size can be diminished, and the C/N ratio can be improved. In addition, wear resistance of the magnetic powders can also be improved and use of the above magnetic powders is preferred in this respect, too.

The rare earth elements used in the present invention include Nd, Y, La, Ce, Pr, Sm, Gd, Yb, Tb, and the like. Among them, Y, La and Ce are preferred.

For the introduction of the rare earth element into the Co-containing ferromagnetic iron alloy powders to make uniform the particle size distribution of the magnetic powders, there may be employed a method of co-precipitating the rare earth element together with Co in the above-mentioned preparation of goethite, a method of suspending iron oxide powders as a starting material for the alloy magnetic powders in an aqueous solution of a rare earth compound, and other methods.

As for the amount of the rare earth element contained in the ferromagnetic iron alloy powders of the present invention, use of the greater amount can make uniform the particle size distribution, diminish the particulate noise and attain a high C/N ratio. Moreover, adhesion of such magnetic powders and the binder can be increased and damage of the magnetic powders at the step of kneading and dispersing of the coating composition can be inhibited. As a result, the structure of the coating film becomes strong and the ferromagnetic iron alloy powders can be inhibited from falling off at the time of high speed sliding, but since too large amount causes decrease in quantity of saturation magnetization of the ferromagnetic iron alloy powders, the amount of the rare earth element is preferably 0.1–10%, more preferably 0.5–7% in the weight ratio of rare earth element/(Fe+Co).

To the ferromagnetic iron alloy powders containing Co and rare earth element, can be added other elements, for example, transition metals such as Zn, Sn, Ni, Mn, Ti, Cr and Cu, and others. However, when an alkali metal or an alkaline earth metal, particularly, Ca is present in the ferromagnetic alloy magnetic powders, this reacts with the fatty acid in the coating film to produce a fatty acid salt on the surface of magnetic layer. Therefore, it is preferred to avoid incorporation of the alkaline earth metal by washing at the time of preparation of the magnetic powders.

Furthermore, the surface of the ferromagnetic iron alloy powders containing Co and a rare earth metal of the present invention is preferably coated with an inorganic oxide for the purpose of inhibition of sintering at the time of reduction by heating and improvement of dispersion in the magnetic coating composition. The inorganic oxides include aluminum oxides, silicon oxides and the like. Among them, aluminum oxides are especially preferred because they are superior in hardness and they can improve wear resistance of the ferromagnetic iron alloy powders. For performing the coating with inorganic oxide, there may be used a method of acting water on a solution of aluminum or silicon in an alcoholate to carry out hydrolysis, thereby previously producing the compound on the surface of the starting iron oxide powders. The coating amount is preferably not less than 0.1% in the weight ratio to the total amount of Fe and Co for the purpose of inhibition of sintering or improvement of dispersion. If the amount is too large, saturation magnetization of magnetic powders decreases and the coating amount is preferably not more than 8%. That is, when the surface of particles is coated with an aluminum oxide, the weight ratio of Al/(Fe+Co) is preferably in the range of 0.1–10%, more preferably in the range of 0.5–6%.

Moreover, since the particle surface of the ferromagnetic iron alloy powders containing Co and rare earth element is very active, they act as catalysts which bring about modification of solvent contained in the magnetic coating composition or modification of the isocyanate component in crosslinking agents used as binders. It is recognized that strength of this activity has correlation with basicity of the magnetic powders, and the pH is preferably lower than 10, especially lower than 8 in accordance with the JIS measuring method (JIS K 5101). If the pH is lower than 6, the ferromagnetic iron alloy powders are apt to be corroded and the pH is preferably not lower than 6. By adjusting the pH value of the ferromagnetic iron alloy powders containing Co and rare earth element to not lower than 6 and lower than 10, the ferromagnetic iron alloy powders are not corroded, formation of modified products in the magnetic coating composition can be inhibited, and the coating film can be made endurable against high speed sliding in the formation of a magnetic layer.

The average length of major axis of the magnetic powders in the present invention is usually 0.01–0.2 $\mu$m, preferably 0.01–0.15 $\mu$m, more preferably 0.02–0.1 $\mu$m. If the average length of major axis is less than 0.01 $\mu$m, the magnetic powders become too fine and productivity becomes inferior. Moreover, since cohesive force of the magnetic powders increases, the powders become difficult to be dispersed in the coating composition, thereby to cause deterioration of the output. If the average length of major axis is more than 0.2 $\mu$m, coercive force and saturation magnetization are deteriorated and, moreover, particulate noise based on the size of particles increases.

The average length of major axis is an average value of actually measured particle sizes of 100 particles in a photograph taken by a scanning electron microscope (SEM). For the same reasons as above, the BET specific surface area of the ferromagnetic iron alloy powders is preferably not less than 35 $m^2$/g, more preferably not less than 40 $m^2$/g, and most preferably not less than 50 $m^2$/g.

The coercive force of the ferromagnetic iron alloy powders containing Co and a rare earth element is preferably 135.3–278.6 kA/m (1700–3500 Oe), especially preferably 159.2–278.6 kA/m (2000–2800 Oe) for obtaining high output and high resolving power with short wavelength recording at high linear recording density. Quantity of saturation magnetization is preferably 15.1–25.1 μwb/g (120–200 emu/g), especially preferably 16.3–20.1 μwb/g (130–160 emu/g) for obtaining good reproduction output at a high recording density and maintaining corrosion resistance of the magnetic powders. As a squareness ratio, σr/σs is preferably not less than 0.46, especially not less than 0.48, further preferably not less than 0.49.

In the present invention, as magnetic characteristics of magnetic layer formed using the ferromagnetic iron alloy powders containing Co and a rare earth element, coercive force is preferably 135.3–278.6 kA/m (1700–3500 Oe), especially preferably 159.2–238.8 kA/m (2000–3000 Oe). Further, the residual magnetic flux density is preferably not less than 0.18 wb/m$^2$ (1800 G), especially preferably 0.2–0.4 wb/m$^2$ (2000–4000 G). The magnetic characteristics of the magnetic layer and the magnetic characteristics of the ferromagnetic iron alloy powders containing Co and a rare earth element are both the values measured at an external magnetic field of 796.0 kA/m (10 kOe) using a sample vibration type flux meter.

The binders used in the magnetic layer include combinations of a polyurethane resin with at least one resin selected from vinyl chloride-based resins such as vinyl chloride resin, vinyl chloride-vinyl acetate copolymer resin, vinyl chloride-vinyl alcohol copolymer resin, vinyl chloride-vinyl acetate-maleic anhydride copolymer resin and vinyl chloride-hydroxyl group-containing alkyl acrylate copolymer resin, cellulose-based resins such as nitrocellulose and cellulose acetate, and the like. Among them, preferred is a combination of a vinyl chloride-hydroxyl group-containing alkyl acrylate copolymer resin with a polyurethane resin. The polyurethane resins include polyester polyurethane, polyether polyurethane, polyether polyester polyurethane, polycarbonate polyurethane, polyester polycarbonate polyurethane, and the like.

These binders preferably have a functional group for improving dispersibility and filling properties of the magnetic powders. The functional groups include COOM, $SO_3M$, $OSO_3M$, $P=O(OM)_3$, $O—P=O(OM)_2$ (M is a hydrogen atom, an alkali metal salt group or an amine salt group), OH, $NR_2$, $N^+R_3$ (R is a hydrogen atom or a hydrocarbon group), epoxy group and the like. When two or more resins are used in combination, they are preferably the same in polarity of the functional groups, and a combination of —$SO_3M$ groups is particularly preferred.

These binders are used in an amount of 5–50 parts by weight, preferably 10–35 parts by weight based on 100 parts by weight of the magnetic powders. Especially, when a vinyl chloride-based resin is used as the binder, the amount is preferably 5–30 parts by weight and when a polyurethane resin is used, the amount is preferably 2–20 parts by weight, and it is especially preferred to use these resins in combination at the above-mentioned ratio.

It is preferred to use together with the binder a thermosetting crosslinking agent which bonds to the functional group and others contained in the binder to perform crosslinking. Preferred examples of the crosslinking agent are polyisocyanates such as tolylene diisocyanate, hexamethylene diisocyanate, isophorone diisocyanate, reaction products of these isocyanates with compounds having two or more hydroxyl groups, e.g., trimethylol propane, and condensation products of the above isocyanates. These crosslinking agents are used ordinarily in an amount of 15–70 parts by weight based on 100 parts by weight of the binder.

Conventionally known abrasives can be added to the magnetic layer of the present invention. Examples of these abrasives are mainly those which have a Mohs hardness of not less than 6, such as α-alumina having at least 90% of α-structure, β-alumina, silicon carbide, chromium oxide, cerium oxide, α-iron oxide, corundum, synthetic diamond, silicon nitride, titanium carbide, titanium oxide, silicon dioxide and boron nitride. These may be used each alone or in combination of two or more. Among them, alumina is especially preferred because it has a high hardness and is excellent in abrasion of head. As to the particle diameter of the abrasives, average particle diameter is preferably 0.01–1.0 μm, more preferably 0.02–0.4 μm, though it depends on the thickness of the magnetic layer.

Furthermore, known carbon black (CB) can be added to the magnetic layer of the present invention for the purpose of improvement in conductivity and running properties. As the CB, there may be used acetylene black, furnace black, thermal black and the like.

The particle diameter of CB is preferably 10–400 nm. This is because if the particle diameter is less than 10 nm, dispersion of CB is difficult and if it is more than 400 nm, a large amount of CB must be added, and, in both cases, when a necessary amount of CB is added, the standard deviation of histogram of surface roughness is apt to become greater. More preferred range is 10–100 nm. Amount of CB varies depending on the particle diameter of CB, but is preferably 0.1–5% by weight. This is because if it is less than 0.1%, the effect to improve conductivity is small, and if it is more than 5%, the standard deviation of histogram of surface roughness is apt to become greater. More preferably, CB of 10–400 nm is used in an amount of about 0.3–5%, and, further preferably, CB of 15–100 nm is used in an amount of about 1.0–2.5%. CB different in particle diameter may be used in combination.

In the above construction of the magnetic recording media of the present invention, inorganic powders, binders, lubricants, carbon black and the like can be used as the constitutive components of the undercoat layer. Either of non-magnetic powders and magnetic powders can be used as the inorganic powders. The non-magnetic powders include α-alumina having at least 90% of α-structure, β-alumina, γ-alumina, α-iron oxide, $TiO_2$ (rutile, anatase), $TiO_x$ (x=1–3), cerium oxide, tin oxide, tungsten oxide, ZnO, $ZrO_2$, $SiO_2$, $Cr_2O_3$, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, titanium carbide, and the like. These are used each alone or in combination of two or more. The magnetic powders include those of low coercive force of not more than 300 Oe, such as γ-$Fe_2O_3$, Co-γ-$Fe_2O_3$ and Ba ferrite.

These inorganic powders may have any shapes of spherical, acicular and platy shapes. If the particle diameter of the inorganic powders is too large, surface properties of the undercoat layer are deteriorated and the surface of the magnetic layer is affected thereby, and, hence, the particle diameter is preferably not more than 0.5 μm. If it is too small, filling properties of the inorganic powders in the undercoat layer increase to reduce the voids which can retain the lubricant and additionally reduce cushioning effect. Thus, the particle diameter is preferably not less than 0.05 μm. Amount of the inorganic powders is preferably 60–90% by weight, especially preferably 70–80% by weight for the same reasons as for the particle diameter.

As the binders used in the undercoat layer, resins similar to those for the magnetic layer are used, and preferably the same resins as used in the magnetic layer are used. Especially, when the same resins are used in the combination of the vinyl chloride-based resin and the polyurethane resin, elasticity of the undercoat layer and that of the magnetic layer are close to each other and load applied by the magnetic head can be successfully dispersed. Moreover, it is preferred that the binders of the under coat layer have the same functional groups as those of the binders of the magnetic layer. Especially, when the functional groups of the binders in the undercoat layer and the magnetic layer are the same in the combination of vinyl chloride-based resin and polyurethane resin, adhesion of the two layers is improved, and, besides, the lubricant smoothly penetrates into the magnetic layer from the undercoat layer. Thus, it is preferred.

Amount of the binder in the undercoat layer is 20–45 parts by weight, preferably 25–40 parts by weight based on 100 parts by weight of the inorganic powders. As in the case of the magnetic layer, it is also preferred for increasing the strength of the undercoat layer to use together with the binder a thermosetting crosslinking agent which bonds to the functional group contained in the binder to perform crosslinking. Amount of the crosslinking agent is preferably 15–70 parts by weight based on 100 parts by weight of the binder.

As the lubricants used in the undercoat layer, there may be used the same lubricants as used in the magnetic layer. However, since a fatty acid is inferior to a fatty acid ester in penetration into the upper layer, it is preferred to use a fatty acid ester alone or use a lubricant in which the proportion of a fatty acid ester is increased. Amount of the lubricant in the undercoat layer is usually 4–18 parts by weight, preferably 5–16 part by weight, more preferably 6–14 parts by weight based on 100 parts by weight of the inorganic powders. The weight ratio of the fatty acid and the fatty acid ester in the undercoat layer is preferably 0/100–40/60, especially 0/100–30/70. The lubricant can be contained in the undercoat layer by adding at the time of mixing of a coating composition for the undercoat layer by a kneader or the like or adding before or after the mixing, or by coating or spraying a lubricant solution or the like on the surface of the undercoat layer.

The carbon black used in the undercoat layer is preferably one which has a particle diameter of 0.01–0.5 $\mu$m. The carbon black is used for securing the voids which retain the lubricant, and, moreover, for attaining compatibility of improvement in strength of coating film of the undercoat layer with cushioning effect. Amount of the carbon black added to the undercoat layer is preferably 5–70 parts by weight, especially 15–40 parts by weight based on 100 parts by weight of the inorganic powders. Examples of the carbon black are "BLACK PEARLS 800", "Mogul-L", "VULCAN XC-72" and "Regal 660R" manufactured by Cabot Co., Ltd., and "Raven 1255" and "Conductex SC" manufactured by Columbia Carbon Co., Ltd. The carbon blacks of 0.05–0.3 $\mu$m in particle diameter include, for example, "BLACK PEARLS 130" and "Monarch 120" manufactured by Cabot Co., Ltd., "Raven 450" and "Raven 410" manufactured by Columbia Carbon Co., Ltd., and "Thermax Powder N-991" manufactured by Cancarb Co., Ltd.

As solvents used for the formation of the magnetic layer and the undercoat layer, there may be used aromatic solvents, ketone solvents, ester solvents, alcohol solvents, hexane, tetrahydrofuran, and the like.

The magnetic layer and the undercoat layer of the present invention can be produced by utilizing known steps for preparation of coating compositions, and it is preferred to employ in combination a kneading step using a kneader or the like and a primary dispersion step. In the primary dispersion step, it is preferred to use a dispersion step by a sand mill as mentioned above.

When the magnetic recording medium of the present invention is in the form of a tape, it is preferred to provide a back coat layer on the side of the medium opposite to the side on which the magnetic layer is provided. By providing the back coat layer, surface electric resistance can be lowered, sticking of dusts which cause head stain can be inhibited, friction coefficient with guide pins and others in running system can be reduced, running of the magnetic tape can be smoothened, and sticking to aluminum cylinder can be inhibited. The back coat layer comprises a filler and a conductive carbon black and may additionally contain inorganic non-magnetic powders such as $\alpha$-$Fe_2O_3$, $Fe_3O_4$, $TiO_2$, graphite, CaO, $SiO_2$, $Cr_2O_3$, $\alpha$-$Al_2O_3$, SiC, $CaCO_3$, $BaSO_4$, ZnO, MgO, boron nitride, TiCl, ZnS, $MgCO_3$, and $SnO_2$ Which are generally used as abrasives, for the purposes of reduction of friction coefficient and enhancement of mechanical strength.

Moreover, there may also be optionally used various additives which are usually added to a back coat layer, for example, lubricants such as higher fatty acids, fatty acid esters and silicone oils, dispersing agents such as surface active agents and other additives.

Any of the above-mentioned binders used in the magnetic layer can be preferably used in the back coat layer, but it is preferred to use a cellulose resin and a polyurethane resin in combination for reducing the friction coefficient and improving the running properties. Content of the binder is preferably about 15–200 parts by weight based on 100 parts by weight of the carbon black or the inorganic non-magnetic powders. Furthermore, in order to cure the binder, it is preferred to use a crosslinking agent such as a polyisocyanate compound.

Thickness of the back coat layer is preferably about 0.3–1.0 $\mu$m after subjecting to calendering treatment. If the back coat layer is too thick, the total thickness of the magnetic recording medium becomes too thick, and, on the other hand, if the back coat layer is too thin, the surface properties of the back coat layer is deteriorated due to the influence of the surface properties of the non-magnetic support, and the surface of the back coat layer is transferred to the magnetic layer to deteriorate electromagnetic conversion characteristics and the like.

Surface roughness of the back coat layer is preferably 3.0–15.0 nm, most preferably 4–10 nm as three-dimensional surface roughness Ra measured by a light interference meter. If Ra is too small, failure in winding is apt to occur and library storage is inferior. If Ra is too large, the surface of the back coat layer is deteriorated in smoothness and this is transferred to the surface of the magnetic layer to roughen the surface of the magnetic layer and to cause increase of exfoliation and deterioration of electromagnetic conversion characteristics. The coating composition for the back coat layer is prepared by, if necessary, carrying out kneading by a kneader, a three-roll mill or the like, followed by carrying out dispersion by a sand mill at the primary dispersion step.

As methods for coating of the layers for the magnetic recording medium of the present invention, there may be employed known coating methods, and these coating methods include gravure coating, roll coating, blade coating, extrusion coating, and the like.

Furthermore, the magnetic recording medium of the present invention is desirably subjected to a surface treatment by calender using a plastic roll or a metal roll after coating and drying for adjusting the surface properties of the magnetic layer and the back coat layer.

It is further preferred to subject the medium to an abrasive treatment after the calendering treatment in order to obtain the magnetic recording medium having the surface properties of the present invention. As the abrasive treatment, mention may be made of treatment by abrasive wheel, treatment by blade and treatment by wrapping tape, and the treatment by abrasive wheel is preferred from the point of productivity. These treatments may be carried out in combination. The abrasive wheels are disclosed in JP-A-62-150519, JP-A-62-172532 and JP-A-2-23521. Materials used for the abrading portions of the wheels are ceramics, super steel, sapphire, diamond and the like. In the case of using an abrasive wheel, peripheral speed of the wheel is preferably in the range of ±200% of the tape running speed (50–300 m/min) and contact angle to the wheel is preferably 5–80°. The treatment by wrapping tape is disclosed in JP-A-63-229622, JP-A-63-259830, Japanese Patent No. 2587315, and Japanese Patent No. 2597222. Finishing state of the medium surface differs depending on the kind of the wrapping tape, and use of those which are higher in surface smoothness, such as #M20000, #WA10000 and #K1000, tends to result in smaller standard deviation and is greater in the effect to inhibit the head stain.

The above patent publications disclose the effect of using a wrapping tape for diminishing the head stain and reducing the output deterioration of a magnetic coating film of not less than 0.5 μm in thickness. It is considered that the diminishment of head stain by using a wrapping tape is attained by the improvement of penetration of the lubricant and the reduction of frictional resistance which are caused subsidiarily by the removal of deposits on the surface of the coating film, particulate components insufficiently fixed on the surface of the coating film and excess binder components. The head stain here is merely exfoliation from the coating film and can be wiped off with alcohol. However, in the case of a magnetic coating film of not more than 0.20 μm in thickness, the wrapping treatment results in decrease of the stain which can be wiped off with alcohol, but causes increase of incrustation scum. As a result of investigation on the causes for the increase of incrustation scum, it has been found that extraction amount of fatty acid has the effect thereon. It is considered that this is because when the surface treatment is carried out, the surface lubricant delicately penetrates into the binder and fragmentation of the surface of the coating film is apt to occur due to the rising of surface temperature caused by sliding of the head. From this viewpoint, the amount of the fatty acid has been optimized. That is, for a multi-layer magnetic recording medium having a magnetic coating film of not more than 0.20 μm in thickness (thickness of a magnetic layer), it is preferred that the surface properties have a standard deviation of not more than 0.56 nm of the components of 10 μm in period provided by the abrasive treatment as mentioned above and the amount of fatty acid extracted by storing the medium at room temperature for 16 hours in hexane is not more than 2 mg/m$^2$. The incrustation scum can be effectively reduced by optimizing the extraction amount as above.

Any of conventionally employed non-magnetic supports can be used as non-magnetic supports in the present invention. Specifically, there may be used films of usually 3–100 μm in thickness which comprise polyesters such as polyethylene terephthalate and polyethylene naphthalate, polyolefins, cellulose triacetate, polycarbonates, polyamides, polyimides, polyamideimides, polysulfones, aramids, aromatic polyamides, and the like.

In case the non-magnetic support has a great anisotropy of shrinkage which occurs in the test under use environment, particularly, high-temperature environment, follow-up properties are deteriorated and tracking errors are apt to occur. Therefore, for the non-magnetic support, it is preferred that the heat shrinkage of 105° C. and 30 minutes, namely, the heat shrinkage when the support is heat treated at 105° C. for 30 minutes and then is cooled by being left to stand is not more than 1.5% in machine direction and not more than 1.0% in transverse direction. The above heat shrinkage is obtained in the following manner. Six test pieces of the non-magnetic support of 10 mm in width and 300 mm in length are prepared from MD/TD, respectively, and they are heat treated in a hot air of 105° C. for 30 minutes, and then length of them are measured. The heat shrinkage is an average value of [(original length−length after shrinking)/original length]×100 (%)

DESCRIPTION OF THE PREFERRED EMBODIMENTS

The present invention will be explained in detail by the following examples, which should not be construed as limiting the invention in any manner.

EXAMPLE 1

| <Components of coating composition for undercoat layer> | |
| --- | --- |
| (1): | |
| Iron oxide powders (particle diameter: 0.15 × 0.023 μm) | 65 parts |
| Carbon black (particle diameter: 75 nm, pH = 8.5) | 12 parts |
| Carbon black (particle diameter: 25 nm, pH = 8.5) | 23 parts |
| Vinyl chloride copolyiner (—SO$_3$K group contained: 0.7 × 10$^{-4}$ equivalent/g) | 9 parts |
| Polyester polyurethane resin (—SO$_3$Na group contained: 1 × 10$^{-4}$ equivalent/g) | 4.5 parts |
| Phenylphosphonic acid | 1.0 part |
| Cyclohexanone | 35 parts |
| Toluene | 18 parts |
| (2): | |
| Stearic acid | 1.25 part |
| Butyl stearate | 1.5 part |
| Cyclohexanone | 53 parts |
| Methyl ethyl ketone | 88 parts |
| Toluene | 25 parts |
| (3) | |
| Polyisocyanate | 4.5 parts |
| Cyclohexanone | 56 parts |
| Methyl ethyl ketone | 28 parts |
| Toluene | 56 parts |

| <Components of coating composition for magnetic layer> | |
| --- | --- |
| (1): | |
| Ferromagnetic alloy powders (Co/Fe: 20 wt %, Y/(Fe + Co): 3 wt %, Al/(Fe + Co): 5 wt %, Ca/Fe: 0, σs: 76.6 μWb/g, Hc: 146.5 kA/m, pH: 8, particle diameter: 0.10 μm) | 100 parts |
| Vinyl chloride-hydroxypropyl acrylate copolymer (—SO$_3$K group contained: 0.7 × 10$^{-4}$ equivalent/g) | 11 parts |
| Polyester polyurethane resin (—SO$_3$Na group contained: 1.0 × 10$^{-4}$ equivalent/g) | 6 parts |
| α-Alumina (average particle diameter: 0.2 μm) | 10.0 parts |
| Carbon black (average particle diameter: 75 nm, DBP oil absorption: 72 cc/100 g, pH = 8.5) | 2.0 parts |

-continued

| <Components of coating composition for magnetic layer> | |
|---|---|
| Phenylphosphonic acid | 1.0 part |
| Methyl ethyl ketone | 30 parts |
| (2): | |
| JP 504 (phosphate ester manufactured by Johoku Kagaku Co., Ltd.) | 2.0 parts |
| Stearic acid | 0.5 part |
| Methyl ethyl ketone | 130 parts |
| Toluene | 80 parts |
| (3): | |
| Polyisocyanate | 4.0 parts |
| Cyclohexanone | 163 parts |

The components (1) of the coating composition for the undercoat layer were kneaded by a kneader, then the components (2) were added thereto, followed by stirring and then dispersing by a sand mill with a retention time of 60 minutes, and the components (3) were added to the dispersion, followed by stirring and filtration to prepare a coating composition for undercoat layer. Separately, the components (1) of the coating composition for the magnetic layer were kneaded by a kneader, then the components (2) were added thereto, followed by stirring and then dispersing by a sand mill with a retention time of 45 minutes, and the components (3) for the magnetic layer were added to the dispersion, followed by stirring and filtration to prepare a magnetic coating composition. The above coating composition for undercoat layer was coated on a support comprising polyethylene terephthalate film (heat shrinkage of 105° C. and 30 minutes: 0.8% in machine direction and 0.6% in transverse direction; elasticity ratio of machine direction/transverse direction: 1.0; thickness: 6.2 μm) so as to give an undercoat layer having a thickness of 2 μm after drying. On the resulting undercoat layer was coated the above magnetic coating composition so as to give a magnetic layer having a thickness of 0.2 μm after subjecting to magnetic field orientation treatment and drying, and the coat was subjected to magnetic field orientation treatment and drying to obtain a magnetic sheet. The magnetic field orientation treatment was carried out by disposing an N—N opposing magnet (5 kG) in front of a dryer and disposing two N—N opposing magnets (5 kG) at an interval of 50 cm at a distance of 75 cm before the position of drying to touch of the coating film in the dryer. Coating speed was 50 m/min.

| <Components of coating composition for back coat layer> | |
|---|---|
| Carbon black (particle diameter: 25 nm) | 100 parts |
| Carbon black (particle diameter: 370 nm) | 4 parts |
| Barium sulfate | 10 parts |
| Nitrocellulose | 30 parts |
| Polyurethane resin (containing SO$_3$Na group) | 55 parts |
| Cyclohexanone | 260 parts |
| Toluene | 260 parts |
| Methyl ethyl ketone | 525 parts |

The above components of the coating composition for the back coat layer were dispersed by a sand mill with a retention time of 45 minutes, and, then, 15 parts of polyisocyanate was added to the dispersion to prepare a coating composition for back coat layer. This was filtered and, then, coated on the side of the above magnetic sheet which was opposite to the side having the magnetic layer, so as to give a back coat layer having a thickness of 0.5 μm after drying and calendering, and the coat was dried.

The thus obtained magnetic sheet was subjected to specular finishing by a seven-stage calender composed of metallic rolls under the conditions of a temperature of 70° C. and a linear pressure of 200 kg/cm, and aged at 60° C. for 48 hours in the state of being wound around a sheet core. Then, the magnetic sheet was cut to ½ inch in width, and the surface of the magnetic layer was subjected to after-treatments of abrading with a wrapping tape and a blade and wiping with allowing the sheet to run at 400 m/min, thereby obtaining a magnetic tape.

In this case, K10000 was used as the wrapping tape, super steel blade was used as the blade, and TORAYSEE was used for the wiping, and the treatments were conducted at a running tension of 100 g. The magnetic tape obtained in this way was set in a cartridge to produce a tape for computers.

EXAMPLE 2

A magnetic tape was produced in the same manner as in Example 1, except that the retention time of the coating composition for undercoat layer in the mill was 60 minutes, the magnetic powders of the magnetic coating composition were changed to ferromagnetic alloy powders (Co/Fe: 30 wt %, Y/(Fe+Co): 5 wt %, Al/(Fe+Co): 6 wt %, Ca/Fe: 0, σs: 76.6 μWb/g, Hc: 183.1 kA/m, pH: 10, particle diameter: 0.10 μm), amount of the alumina was changed to 15 parts, the calendering conditions were changed to 80° C. and 200 kg/cm, and the abrasion tape was changed to M20000.

EXAMPLE 3

A magnetic tape was produced in the same manner as in Example 2, except that amount of the stearic acid in the coating composition for undercoat layer was changed to 2.0 parts, that of the phenylphosphonic acid was changed to 2.0 parts, thickness of the undercoat layer after drying was changed to 1.5 μm, thickness of the magnetic coating composition after drying was changed to 0.18 μm, and the super steel blade (nose angle: 30°) in the after-treatments was changed to sapphire blade (nose angle: 60°).

EXAMPLE 4

A magnetic tape was produced in the same manner as in Example 2, except that amount of the stearic acid in the coating composition for undercoat layer was changed to 2.0 parts, that of the phenylphosphonic acid was changed to 2.0 parts, thickness of the undercoat layer after drying was changed to 1.0 μm, thickness of the magnetic coating composition after drying was changed to 0.18 μm, and the super steel blade (nose angle: 30°) in the after-treatment was changed to sapphire blade (nose angle: 60°).

EXAMPLE 5

A magnetic tape was produced in the same manner as in Example 2, except that amount of the stearic acid in the coating composition for undercoat layer was changed to 2.0 parts, that of the phenylphosphonic acid was changed to 0 part, thickness of the undercoat layer after drying was changed to 1.0 μm, amount of the alumina in the magnetic coating composition was changed to 8 parts, that of the stearic acid was changed to 0.3 part, that of the phenylphosphonic acid was changed to 2.0 parts, that of the stearic acid added together with JP504 was changed to 0.3 part, thickness of the magnetic layer after drying was changed to 0.18 μm, and an abrasion wheel (diameter: 50 mm, contact angle with magnetic tape: 20°) was used in place of the wrapping tape in the after-treatments.

EXAMPLE 6

A magnetic tape was produced in the same manner as in Example 2, except that the iron oxide powders in the coating composition for undercoat layer were changed to iron oxide powders (particle diameter: 0.11×0.023 µm), amount of the stearic acid in the coating composition for undercoat layer was changed to 1.5 parts, the retention time of the coating composition for undercoat layer in the mill was changed to 45 minutes, thickness of the undercoat layer after drying was changed to 1.0 µm, amount of the alumina in the magnetic coating composition was changed to 12 parts, that of the phenylphosphonic acid was changed to 1.5 parts, that of the JP504 and that of the stearic acid were changed to 2.5 parts and 0.3 part, respectively, thickness of the magnetic layer after drying was changed to 0.18 µm, the calendering conditions were changed to 70° C. and 200 kg/cm, and the wrapping tape in the after-treatments was changed to K10000.

EXAMPLE 7

A magnetic tape was produced in the same manner as in Example 6, except that the carbon black in the magnetic coating composition was changed to carbon black (average particle diameter: 100 nm, DBP oil absorption: 52 cc/100 g, pH=6.5) and the amount thereof was changed to 1.5 parts, the alumina was changed to α-alumina (average particle diameter: 0.4 µm), and the amount thereof was changed to 10 parts.

EXAMPLE 8

A magnetic tape was produced in the same manner as in Example 6, except that amount of the phenylphosphonic acid in the coating composition for undercoat layer was changed to 2.5 parts, the carbon black in the magnetic coating composition was changed to carbon black (average particle diameter: 100 nm, DBP oil absorption: 52 cc/100 g, pH=6.5) and the amount thereof was changed to 1.5 parts, alumina was changed to α-alumina (average particle diameter: 0.4 µm), and the amount thereof was changed to 10 parts, the calendering conditions were changed to 70° C. and 250 kg/cm, and the wrapping tape in the after-treatments was changed to M20000.

COMPARATIVE EXAMPLE 1

A magnetic tape was produced in the same manner as in Example 1, except that thickness of the magnetic coating composition after drying was changed to 0.5 µm and the wrapping tape in the after-treatments was changed to WA4000.

COMPARATIVE EXAMPLE 2

A magnetic tape was produced in the same manner as in Example 1, except that the vinyl chloride-hydroxypropyl acrylate copolymer in the coating composition for undercoat layer was changed to vinyl chloride-vinyl acetate-vinyl alcohol copolymer (OH group: 0.6 wt %), the retention time in the mill was changed to 90 minutes, amount of the alumina in the magnetic coating composition was changed to 15 parts, and that of stearic acid was changed to 0 part.

COMPARATIVE EXAMPLE 3

A magnetic tape was produced in the same manner as in Example 2, except that the phenylphosphonic acid in the coating composition for undercoat layer was changed to 0.5 part of PHOSPHANOL RS410 (a phosphate ester manufactured by Toho Chemical Co., Ltd.), thickness of the coating composition for undercoat layer after drying was changed to 1.0 µm, amount of the phenylphosphonic acid in the magnetic coating composition was changed to 0 part, that of JP504 was changed to 1.5 parts and that of stearic acid was changed to 2 parts.

COMPARATIVE EXAMPLE 4

A magnetic tape was produced in the same manner as in Example 2, except that amount of the stearic acid in the coating composition for undercoat layer was changed to 2.0 parts, that of the phenylphosphonic acid was changed to 2.0 parts and 0.5 part of PHOSPHANOL RS410 was added together with the stearic acid, amount of the phenylphosphonic acid in the magnetic coating composition was changed to 2.0 parts, 0.3 part of stearic acid was added together with JP504, thickness of the magnetic coating composition after drying was changed to 0.18 µm, and the super steel blade (nose angle: 30°) in the after-treatments was changed to sapphire blade (nose angle: 60°).

COMPARATIVE EXAMPLE 5

A magnetic tape was produced in the same manner as in Example 2, except that 1.0 part of stearic acid was used in place of the phosphonic acid in the coating composition for undercoat layer, amount of stearic acid added later was changed to 1.0 part, amount of the phenylphosphonic acid in the magnetic coating composition was changed to 0 part and that of stearic acid was changed to 0.3 part.

Evaluation Methods:

Output Deterioration:

Measurement was conducted in an environment of 40° C. and 5% RH using DTL4000 drive. 2F signal ($\lambda$=0.93 µm) was recorded and the whole length of the tape was allowed to run 64 times (32 reciprocations) at a running mode of read-after-write, and an average output at the first running and the 64th running was measured. The decrement of output between the first average output and the output at the 64th running was regarded to be output deterioration.

Incrustation Scum:

The tape was allowed to run 64 times under the same running conditions as in the measurement of the output deterioration in an environment of 20° C. and 5% RH. After cleaning the head with alcohol, the gap part of the read head was observed by a microscope to judge whether incrustation scum occurred or not.

Results of evaluation such as standard deviation ($\sigma$) of histogram when magnetic layer was measured by a light interference surface roughness meter, incrustation scum of head, output deterioration, etc. are shown in Table 1.

TABLE 1

| | Standard deviation σ (nm) | Extraction amount of lubricant | | Incrustation scum | Output deterioration (dB) |
| --- | --- | --- | --- | --- | --- |
| | | Component extracted with hexane (mg/g$^2$) | Total of extraction amounts (mg/g$^2$) | | |
| Example 1 | 0.56 | 1.7 | 10.4 | No | 3.0 |
| Example 2 | 0.22 | 1.4 | 8.7 | No | 1.5 |
| Example 3 | 0.45 | 1.8 | 13.7 | No | 3.0 |
| Example 4 | 0.56 | 1.2 | 13.0 | No | 2.5 |

TABLE 1-continued

| | Standard deviation σ (nm) | Extraction amount of lubricant | | Incrustation scum | Output deterioration (dB) |
| --- | --- | --- | --- | --- | --- |
| | | Component extracted with hexane (mg/g$^2$) | Total of extraction amounts (mg/g$^2$) | | |
| Example 5 | 0.56 | 1.8 | 14.7 | No | 3.5 |
| Example 6 | 0.22 | 1.6 | 11.5 | No | 1.8 |
| Example 7 | 0.34 | 1.6 | 11.5 | No | 2.0 |
| Example 8 | 0.17 | 0.4 | 6.4 | No | 0.5 |
| Comparative Example 1 | 1.12 | 2.3 | 11.4 | Occurred | 12.0 |
| Comparative Example 2 | 1.40 | 2.1 | 8.6 | Occurred | 12.5 |
| Comparative Example 3 | 0.84 | 0.1 | 25.1 | Occurred | 8.0 |
| Comparative Example 4 | 0.73 | 5.2 | 15.1 | Occurred | 10.0 |
| Comparative Example 5 | 1.01 | 3.0 | 23.0 | Occurred | 12.5 |

As is clear from the results of Examples 1–8 and Comparative Examples 1–5 shown in Table 1, the magnetic recording media show no incrustation scum of magnetic head and are very small in output deterioration when the media comprise a non-magnetic support on one side of which are provided at least one undercoat layer and a magnetic layer in succession and on another side of which is provided a back coat layer, thickness of the magnetic layer is not more than 0.2 μm, and standard deviation of histogram when the magnetic layer is subjected to measurement by a light interference surface roughness meter is not more than 0.56 nm.

What is claimed is:

1. A magnetic recording medium comprising a non-magnetic support on one side of which at least one non-magnetic undercoat layer and a magnetic layer are provided in succession and on another side of which is provided a back coat layer, said magnetic layer having a thickness of not more than 0.20 μm and a standard deviation of histogram obtained by subjecting the surface of the magnetic layer to measurement by a light interference surface roughness meter being not more than 0.56 nm, wherein said magnetic recording medium contains a fatty acid and an amount of said fatty acid extracted in hexane when the magnetic recording medium is stored in hexane at room temperature for 16 hours is not more than 2 mg/m$^2$.

2. A magnetic recording medium according to claim 1, wherein when the magnetic recording medium is stored in hexane, THF and an acetic acid solution successively in this order at room temperature for 16 hours, respectively, a total amount of said fatty acid extracted in the hexane, THF and the acetic acid solution is not more than 25 mg/m$^2$ per 1 μm in thickness of the magnetic layer and the non-magnetic undercoat layer.

\* \* \* \* \*